United States Patent
Williams

[15] 3,660,076
[45] May 2, 1972

[54] TREATMENT OF MATERIAL REMOVED FROM MOLTEN ALUMINUM

[72] Inventor: Merlyn M. Williams, Montreal, Quebec, Canada

[73] Assignee: Alcan Research and Development Limited, Montreal, Quebec, Canada

[22] Filed: Sept. 17, 1970

[21] Appl. No.: 73,261

[52] U.S. Cl. .................................75/68 R, 23/142, 75/24, 241/19
[51] Int. Cl. ....................C22b 7/00, C22b 21/00, C01f 7/02
[58] Field of Search.......................75/24, 68 R; 241/18, 19; 23/142

[56] References Cited

UNITED STATES PATENTS

| | | | |
|---|---|---|---|
| 2,300,141 | 10/1942 | Whitzel..................................75/65 R |
| 2,302,981 | 11/1942 | Stern......................................75/68 R |
| 2,754,199 | 7/1956 | Stroup et al............................75/68 R |

OTHER PUBLICATIONS

Garst et al.; Bureau of Mines Report of Investigations 3874; 1946.

Primary Examiner—Henry W. Tarring, II
Attorney—Robert S. Dunham, P. E. Henninger, Lester W. Clark, Gerald W. Griffin, Thomas F. Moran, R. Bradlee Boal, Christopher C. Dunham, Robert Scobey and Henry T. Burke

[57] ABSTRACT

Material such as is skimmed from the surface of molten aluminum in a casting furnace, which usually contains considerable aluminum metal along with chemical compounds such as alumina, is crushed and treated with dry steam at a moderately elevated temperature, so that unwanted carbides and nitrides are eliminated and the treated skim or the like is conditioned for recovery of useful values, advantageously by classification thereafter into a coarse fraction providing aluminum metal suitable for remelting and a fine fraction in which chemical material is reclaimed, that may include values suitable for use in the fused bath of an aluminum reduction cell.

18 Claims, No Drawings

TREATMENT OF MATERIAL REMOVED FROM MOLTEN ALUMINUM

BACKGROUND OF THE INVENTION

This invention relates to the treatment of material skimmed from the surface of molten aluminum, or more generally material segregated, whether floating or settled as sludge, from a body of molten aluminum, i.e., in furnaces where aluminum metal is melted or collected in melted form, e.g., for casting, as well as for refining the metal, or making aluminum base alloys, or other purposes. In particular, the invention is related to methods of treating such skim or the like, which usually contains aluminum metal and certain chemical values, so as to provide substantial recovery of the metal as such, and likewise of the chemical values in useful form. It will be understood that references herein to aluminum metal include aluminum base alloys, e.g., wherein a major constituent is aluminum.

During holding or treatment in conventional casting furnaces, where aluminum metal is remelted or otherwise collected in molten form, and may be subjected to such treatments as cleaning, degassing, alloying and the like, the molten metal accumulates a considerable quantity of material at its surface, in exposure to the furnace atmosphere. This material is skimmed from the furnace from time to time, at least just before the metal is run out for casting, and also conventionally after each such discharge operation, for example after casting one or more ingots or a group or series of same in the conventional, vertically continuous, direct chill casting process, or indeed after any casting operation whether in continuous form or in separate ingots or other bodies.

This skim generally constitutes a gray porous agglomerate which more or less solidifies as it floats on the surface and is removed in pieces or fragments. It is well known that the material contains variable quantities of aluminum metal and also chemical materials such as alumina and fluorides of sodium and aluminum, there being also occasionally other material including compounds of calcium, magnesium and manganese and including chlorides, of these or other metals, which may form and collect at the metal surface during a chlorine fluxing cycle in the metal refining operation in the furnace. To some extent, the skim results from oxidation of aluminum metal at the surface, and from reactions in the furnace as above, but to a considerable extent on newly produced metal the chemical values appear to have originated by inclusion or entrainment in the aluminum as collected in the aluminum reduction cell beneath the molten cryolite-alumina bath in such cell. A common or frequent characteristic of the skim material is a content of carbide and nitride, at least chiefly of aluminum.

While chemical processes, e.g., wet processes using aqueous solutions, are conceivable for treatment of skim for recovery of ultimately dried compounds, containing aluminum and fluoride values, such as might thereafter be employed in the refused bath of a reduction cell, it does not appear that any simple and efficient operation has been available for such recovery, nor specifically, any operation which would effectively reclaim the aluminum metal as such, or recover the metal separately from the chemical material.

A particular problem is that carbides and nitrides are regarded as deleterious in aluminum reduction cells so that it is undesirable simply to take the skim, for example, and feed it into the molten bath of such a cell with the view of thus utilizing the alumina and the sodium and aluminum fluoride content, and with the hope, by no means assured, that some of the valuable uncombined metal will deposit at the bottom of the cell. Prolonged exposure to the atmosphere does not alter the skim very much, but submergence in water tends to modify the material, affording some separation of insoluble solids and particles of aluminum metal. In such case, however, the product is recovered in a wet condition, which complicates handling and reclaiming the desired materials. Such modification in water is believed to involve some occurrence of chemical reactions between water and some of the chemicals present in the skim, such as aluminum carbide and nitride, and aluminum oxide. These reactions are principally represented by the following equations or types of equations:

$$Al_4C + 12 H_2O = 3CH_4 + 4Al(OH)_3 \tag{1}$$
$$Al_2N_2 + 3H_2O = 2NH_3 + 2Al(OH)_3 \tag{2}$$
$$Al_2O_3 + 3H_2O = 2Al(OH)_3 \tag{3}$$

It may also be noted that roasting procedures such as have been proposed for reclaiming operations on the used carbon lining of reduction cells, or on carbon-containing materials taken or remaining from the molten bath of such cells, are not of significant value for casting furnace skim, which is of different and indeed unique character in its content, often very substantial, of aluminum metal that has been absorbed in liquid state by a sponge effect. In roasting or burning operations on reduction cell materials, even though water vapor can be introduced for converting carbides and nitrides to gaseous products, the treatment requires direct flame or like heating to relatively high temperatures of the order of 1,000° F., e.g., 1150° F., whereby the carbon content of the material is destroyed. Any such operation on casting furnace skim (which ordinarily does not contain significant free carbon) would tend to burn at least some aluminum metal, or otherwise deplete it by oxidation, and thus interfere with its efficient recovery. As will be understood aluminum metal is considerably more valuable than its oxide and its reclamation in metallic state is therefore of substantial economic significance.

SUMMARY OF THE INVENTION

For the recovery of useful products by treatment of aluminum furnace skim, i.e., material skimmed from molten aluminum, the invention comprises a novel and relatively simple but effective process, comprising breaking up the agglomerate which constitutes the skim, e.g., crushing to a moderately small size, and then subjecting the crushed material or fragments to a suitably controlled steam hydration for an appropriate time in a confined region at convenient, moderately elevated temperature, very substantially below the melting point of aluminum or any such temperature as mentioned above for treatment of other materials.

Such operation is then followed by a classifying step, for example by screening, which allows recovery of a fine fraction of solids that contain useful chemical material, and a coarser fraction of particles or pieces that comprise aluminum metal, with some amounts of chemicals, usually minor amounts of chemicals such as fluorides and alumina adhering to the surface, this aluminum metal fraction being generally in a condition for ready remelting. The operation is of particular advantage in that it effectively affords removal of carbides and nitrides, and at the same time is reliable and easily controlled. Furthermore, it directly yields both the metal and the useful chemical values in an immediately dry form, requiring no special processing in most cases, before utilization, as by reintroducing the coarse fraction of metal into the molten aluminum of a furnace, and adding the fine chemical fraction, if desired, directly into the molten electrolyte of an aluminum reduction cell.

In a specific, presently preferred mode of operation the process comprises exposing the crushed skim in a suitable pressure hydrator, i.e., a closed vessel having means to support the material in accessible position, whereupon live steam, e.g., saturated or other dry steam, is supplied at an appropriate superatmospheric pressure, for example 15 psi (gauge) or higher. After continued exposure of the skim fragments to the steam under pressure for an appropriate length of time, such as several hours or more, the treatment is concluded. A particular feature is that the nitride and carbide content is eliminated by reaction with the water that constitutes the steam, to yield gaseous products, e.g., ammonia and methane, in accordance with equations (1) and (2) above. Hence, the conclusion of reaction may usually be determined by disappearance of these compounds in the exhaust from the vessel.

The resulting solid product in the hydrator is essentially dry and has undergone some disintegration of its particles or pieces as a partial effect of and along with the chemical decompositions or other reaction indicated above, these being one or more, ordinarily all, of the reactions (1), (2) and (3). In general, the product is found to be capable of size classification, as by screening or other suitable mode, whereby a fine fraction, such as minus one-eighth inch or minus one-sixteenth inch, may be separated.

These finest particles may contain some metal but as a rule consist principally of useful chemical material of the sort originally contained in the skim (except for carbide and nitride, now in effect eliminated to the extent that such were present), e.g., chiefly material of the class of fluoride, oxide and hydroxide of aluminum and sodium. To the extent that other salts such as chloride or compounds of other metals such as calcium, magnesium and manganese may be present, these are ordinarily in very small proportions so that such of them as are not wanted will not constitute a significant impurity when the material is used in the bath of a reduction cell. This finer fraction is thus chemically appropriate for electrolytes of reduction cells, i.e., so-called pots, especially by reason of its content of fluoride and also its content of oxide or hydroxide of aluminum, i.e., alumina or alumina hydrates. Although conceivably some further procedure for chemical separation can be employed, this fraction of the dry chemical product from the hydrator can often be added directly to pot baths, i.e., for there augmenting the same chemical values which it contains and which can be specifically identified in it, if desired, by simple analysis.

The coarser fraction of the hydrator product is found to consist of lumps or pieces which in preferred practice are in the main aluminum metal, together with relatively minor quantities of chemical materials, i.e., the form of this fraction being usually such that it can be readily remelted, either in the casting furnace or separately, for effective recovery of metal.

It will be seen that the process is effective and relatively fast, while yielding products that are entirely dry and essentially only need to be separated by size classification. The skim has been stabilized by removing carbides and nitrides, and the recovered metal is directly useful for remelting as such. The chemicals are likewise in a form suitable for easier handling and further processing and use, especially in that the nitride and carbon contents, considered harmful in pot operation, have been removed.

DETAILED DESCRIPTION OF THE INVENTION

In detail, the present process may be particularly described in connection with examples of its practice, e.g., as successfully tested in pilot operations.

When the floating material is skimmed from the metal surface in a casting furnace at a time desired for such removal, it is taken out as a segregated agglomerate, readily removable in pieces from the furnace chamber. It may then be subjected to a crushing operation, reducing it to a particle size, for instance, of less than three-fourths inch, as to yield a product correspondingly containing particles from sizes above one-half inch down to a considerable fraction smaller than one-eighth inch. While the crushed material may, if desired, be graded, for example to remove the minus 1/16 inch particles or perhaps only the very finest particles, effective results have been obtained by using the ungraded product of an ordinary crushing operation. Likewise, while the suggested maximum of ¾ inch diameter particles has been found useful, it is conceived that other ranges can be employed, e.g., even including pieces as large as 4 inches, or sometimes still larger fragments, although longer hydration times may then be required, as can be readily determined by test.

The form of the pressure apparatus employed for the hydration stage does not seem to be critical in any general sense, the chief requirement being for a suitably confined vessel, adapted to hold the crushed skim material in appropriate exposure to the supplied steam under pressure. In one set of tests, the hydrator consisted of a cylindrical vessel 3 feet in diameter and 7½ feet high, having a removable steel rack which was seated in the vessel and which was designed to support a multiplicity of vertically spaced trays, e.g., 13 such trays, each holding up to 100 pounds of crushed skim, spread out in the tray. The vessel had a safety valve, pressure gauge and thermometer of conventional forms and included a bleeding valve with an exhaust hose or pipe, e.g., to avoid accumulation of combustible gases and also to permit inspection or test of the departing steam or gas as for indication of the extent of the hydration reactions.

With the hydrator suitably loaded, live steam from an appropriate source is introduced at a suitable pressure, which in general is in the range from 15 to 40 psi (gauge), whereupon it is found that under the described circumstances and with the crushed skim agglomerate in the particle size range below about three-fourths inch, effectively complete reaction is achieved in about 4 to 10 hours. Ammonia and hydrocarbons are evolved, respectively from nitrides and carbides, during the decomposition process; these will tend to vary in amount, from one batch of skim to another. Although completion of reaction can be judged by other tests (especially in cases where relatively little carbide or nitride is present), or by experience in recurring types of cases, a suitable indication is usually afforded by the disappearance of the odor or odors of ammonia and some kinds of hydrocarbons from the exhaust gas, and indeed by the termination of gas evolution. It does not appear that within reasonable limits excess length of treatment time is significantly detrimental, but it is highly advantageous to achieve efficiency in time and in utilization of steam, by avoiding unduly prolonged treatment.

It is important, of course, for proper practice of the process and recovery of aluminum metal, that the hydration temperature be maintained not only substantially below the melting point of aluminum but below any level that would cause or promote significant reaction of the metal, e.g., by oxidation whether of the nature of combustion or otherwise with any air or oxygen present, or correspondingly by reaction with any of the other substances, including steam, that are present. In general, the temperature should thus be kept not higher than about 400° F. As will be understood, steam at 15–40 psi will usually have a temperature of the order of 250°–350° F., or perhaps somewhat higher; in a broader sense, it is presently believed to be desirable that the steam pressure be in the range of 15 to 230 psi and the temperature in the range of 250° to 400° F.

It is of special advantage that the steam be dry, as distinguished from a mixture of steam and water droplets which would leave the treated pieces and particles of skim in an appreciably wet condition. Reference to dry steam is intended in a generic sense, i.e., as not excluding superheated steam or steam otherwise raised to a temperature above that corresponding to so-called dry saturated steam at the selected pressure. Preferably the steam is supplied live and under pressure, but in a broad sense the chief reason for superatmospheric pressure is to insure dryness.

Utilizing procedure and apparatus as described above, a series of tests were made with quantities of skim, treated in the hydrator in amounts of about 1,000 pounds, that had been removed from the surface of molten aluminum metal in a casting furnace wherein the melt was metal which had been newly produced, being brought in molten state from the pots of a reduction plant. The process is, of course, equally applicable to metal remelted in the furnace after having been first cast in some suitable form upon removal from the pot or pots. In the furnace, the metal was subjected to conventional cleaning, refining and/or alloying treatment prior to run-out of quantities for casting. The solidified skim was removed before and after each run-out, and was crushed to minus one-half inch and subjected to the described live dry steam treatment in the hydrator, usually at a pressure of about 15 psi for a period of about 8 hours, evolution of gas in each case having then ceased. In the examples of the process thus constituted by the foregoing, further details of operation and characteristics of the materials, which are representative of such examples, were as follows below.

Upon withdrawal from the vessel in each case, the treated skim material was found to be further disintegrated, particularly in yielding a greater amount of fine particles, and it was then classified by screening into a fine fraction of minus one-eighth inch and the remaining coarser fraction. The fine fraction consisted principally of fluorides and alumina or alumina hydrate, with relatively little or minor amounts of aluminum metal, i.e., containing an average of about 18 percent (by weight) of the total metal in the skim, all percentages herein being by weight unless otherwise indicated. The coarser fraction, as explained above, consisted primarily of particles of aluminum metal, i.e., containing an average of about 82 percent of the metal in the skim, with some adhering quantity of chemical material, chiefly alumina and alumina hydrate, and some fluorides.

A representative screen analysis of skim material removed from the casting furnace and crushed to minus three-fourths inch size is given in the following table, i.e., respectively as to a collected accumulation of the unhydrated material, and as to a specific, representative, smaller lot of such material that had been treated in the hydrator, before further classification:

TABLE I

| Mesh | Unhydrated Material Weight lbs. | % | Hydrated Material Weight lbs. | % |
|---|---|---|---|---|
| +½" | 600 | 20 | 166 | 16 |
| −½"+⅛" | 1300 | 43 | 399 | 40 |
| −⅛" | 1115 | 37 | 455 | 44 |
| Total | 3015 | 100% | 1030 | 100% |

As will be noted, the proportion of the smallest particle sizes increases, with corresponding decrease in the larger size, as a result of hydration; the larger pieces, in effect representing metallic aluminum, are depleted in chemical substances, while the fine, predominantly chemical-containing fraction is enlarged.

Chemical analyses of the unhydrated skim and of the hydrated product resulting from the present process have confirmed and established the results explained above.

The total aluminum metal in a representative lot of unhydrated skim averaged 31.5 percent (by weight) as determined by fire assay methods. It was distributed as follows: the plus ½ inch fraction contained 50 percent metal by weight, which in turn represented 8 percent of the original agglomerate; the second fraction, being minus ½ inch to plus ⅛ inch material, contained 44 percent of metal, the latter representing 17.6 percent of the original skim material. Finally, the minus ⅛ inch fraction contained only 13.5 percent of metal, being 5.9 percent of the original agglomerate. Normal impurities of aluminum metal in the furnace, of which iron and silicon are the principal elements, appeared to be randomly dispersed in the metal of the three fractions. Graded as to aluminum content, small random samples of the skim metal ranged from 98.08 percent to 99.13 percent aluminum.

Again in the original skim agglomerate, significant quantities of alumina were present. The minus ½ inch and plus ⅛ inch fraction contained about 30 percent alumina present by weight while the minus ⅛ inch portion had an alumina content of about 49 percent.

Referring further to the three above-identified fractions, being respectively coarse, medium and fine, the medium fraction averaged 5.8 percent fluorine and 3.9 percent sodium, both measured as such, while similarly determined values for the fine fraction were 11.4 percent fluorine and 7.1 percent sodium. From these analyses the average sodium to fluorine ratio was calculated to be about 0.65. Inasmuch as the normal or theoretical ration in cryolite is of the order of about 0.6, it is apparent that a significant quantity of pot bath material exists in the skim. In other words, skim from reduction cell metal can be taken to contain up to the equivalent of about 13 percent cryolite.

The average nitride and carbide content in the untreated skim was found to be 2.7 percent and 2.2 percent respectively. It was found possible to reduce the residual total nitride and carbide by the present hydration process to negligible values, indeed to as little as 0.13 percent. It is thus demonstrated that hydration at low steam pressures is an effective operation for removing these unwanted materials.

The moisture content of the skim ranged from 5 percent to 7 percent or slightly above, both for the unhydrated material and the hydrated product. It was found that each could, if desired, be dried to a low level of moisture. For example, a moderate drying of a representative sample of the hydrated material at 750° F. for 15 minutes reduced the percent moisture content from 7.3 to 1.74, a value comparable to that of alumina as ordinarily used in reduction cells. In general, however, such drying is not required in practical application of the present process. The medium and finer fractions of the unhydrated material also contained very minor amounts of chlorides, such as magnesium and manganese, i.e., when a chlorine fluxing cycle is employed in metal refining, causing formation of such compounds at the metal surface. These are ordinarily insufficient to interfere with the use of the ultimate, fine fraction of hydrated product in a reduction cell bath. Indeed a small chloride content is sometimes desired in such baths, for known purposes.

Summarizing a typical composition of the raw skim, as to chief constituents, is as follows (the loss on ignition being chiefly free or combined water):

TABLE 2

| Element | Raw Skim % |
|---|---|
| Al Metal | 32 |
| $Al_2O_3$ | 43 |
| F | 7 |
| Na | 5 |
| Carbide | 2.2 |
| Nitride | 2.7 |
| L.O.I. | 8 |

Continuing with the described specific examples of the hydration treatment, effected with the above skim at 15 psi for 8 hours and followed by screening to separate a fine, minus ⅛ inch fraction, which was 44 percent of the total hydrator product, the analysis of a representative sample of such fraction was:

TABLE 3

| Al (metal) | 13.5% |
|---|---|
| Al (combined) | 25.9% |
| Na | 7.1% |
| F | 11.4% |
| Other elements (except O and H) | 6.8% |

The balance was oxygen and OH, chiefly combined with aluminum, and entrained moisture. This fine product fraction was suitable for introduction in pot baths, i.e., to replace alumina and cryolite.

The remaining, coarse fraction of the hydrator product in this instance contained 94 percent aluminum metal, balance chemical material similar to that in the fine particles. If desired, much of the adhering chemical material could be easily removed, but even without such removal, product fraction was suitable for remelting, e.g., by addition to the casting furnace, thus affording good recovery of valuable metal.

In most cases the skim material as described above, which is treated in the form of fragments in the hydrator, consists essentially or at least chiefly of (a) aluminum metal; (b) unwanted material of the class consisting of aluminum carbide and nitride; and (c) chemical material of the class consisting of fluoride and oxide of aluminum and sodium, with some hydroxides if the removed skim has been exposed to hydration by the atmosphere for some time. Other chemical values are often present in minor amounts but substances from the above classes represent the principal materials of which one or more may be found in the skim and which are the substances of concern in the present invention, either for recovery or elimination. As will also be appreciated, the reaction to which aluminum carbide and nitride are subjected by the steam treatment, yield further quantities of aluminum hydroxide (alumina hydrate), or conceivably oxide, which thus in effect augment the chemical material of the above class (c).

The classification of the hydrator product could be selected to make the fine and coarse cut at some other particle size, and the mechanical treatment of such product could conceivably include some further comminution, before screening, all as may best suit the physical and chemical characteristics of the product in a given case. Good practical results, however, were obtained in the tests outlined above where the steam hydrated material was directly subjected to size separation at one-eighth inch.

The process is of special advantage for skim removed from molten metal that has been supplied more or less directly from aluminum reduction cells, i.e., whether the metal is transported to the furnace in melted condition, or whether it is remelted from solidified bodies of the metal that has been drawn from the pots. In a more general sense, skimmed material from other aluminum melting furnaces, or from any situation where a body of molten aluminum has an exposed surface, can be subjected to the present process with some advantage, at least to separate alumina, that is invariably present in all such skim, from aluminum metal entrained in it; as will be appreciated, the hydration of such alumina or part of it results in at least some disintegration of the fragments of agglomerated skim. The process is of exceptional advantage where (1) the chemical-containing skim includes sufficient aluminum metal to justify reclaiming the latter as such, and at the same time (2) the chemical content of the skim contains unwanted nitride or carbide. As indicated above, however, there is utility for the hydration treatment when either one of the above conditions (1) and (2) exists alone, e.g., at least for recovery of chemical values, but preferably to permit separate recovery, where condition (1) prevails, of aluminum metal and some chemical material, e.g., alumina.

Thus the process is deemed useful where the raw segregated material, e.g., skim, contains at least about 3 percent of aluminum metal, and is specially advantageous when there is 20 percent, or preferably more, of metallic aluminum present. Not uncommonly, skimmed material is found to have a metal content upwards of 50 percent. As indicated, the operations are in a particular sense directed to the unique situation of skim carrying absorbed metal that has solidified therein during or after removal of the skim from a furnace or the like, but the procedure can be applied to other segregated material (containing chemical, e.g., combined aluminum values) such as furnace sludge, especially where the latter after separation necessarily contains aluminum metal. In all cases the process is effective, reliable, easily controlled and generally efficient, and for the most part involves no wet treatments or at least, no extensive further operations.

It is to be understood that the invention is not limited to the specific examples herein described but may be carried out in other ways without departure from its spirit.

I claim:

1. In a method of treating segregated material which is separated from a body of molten aluminum and which contains aluminum metal and chemical material, the step of treating fragments of said segregated material in a confined region with dry steam at a temperature substantially below the melting point of aluminum, for a sufficient time to exert hydrating influence on said chemical material and to convert said segregated material into form capable of treatment for classification by particle size to yield a fine fraction which contains chemical material derived from the first-mentioned chemical material and a coarser fraction which contains aluminum metal.

2. A method as defined in claim 1, in which said steam treatment is effected at a temperature not higher than about 400° for at least several hours.

3. A method as defined in claim 2, in which said steam treatment is effected at a pressure of at least about 15 psi for at least about 4 hours.

4. A method as defined in claim 2 in which said segregated material, as subjected to said steam treatment, has particle sizes not greater than about 4 inches, and said steam treatment is effected for a period of time in a range up to about 10 hours.

5. A method as defined in claim 4, in which said steam treatment is effected at a temperature in the range of 250° to 450° F.

6. A method as defined in claim 1, in which said segregated material which is treated contains material of the class consisting of carbide and nitride, and said treating step is effective for reaction of said steam with said last-mentioned material to release gaseous product of the class consisting of hydrocarbon and ammonia.

7. A method as defined in claim 6, in which said segregated material which is treated contains aluminum oxide, and said treating step is effective for hydration of at least some of said aluminum oxide.

8. A method as defined in claim 1, in which said segregated material that is treated contains at least about 20 percent aluminum metal, and which includes classifying the product of said steam treatment into said fine and coarser fractions, said treating and classifying steps coacting to yield said coarser fraction having a percentage content of aluminum metal substantially greater than the content of said metal in the segregated material that is treated.

9. A method of treating skim which is removed from the surface of molten aluminum and which contains aluminum metal, unwanted material of the class consisting of aluminum carbide and nitride, and chemical material of the class consisting of fluoride, oxide and hydroxide of aluminum and sodium, comprising crushing said skim, treating the crushed skim in a confined region with dry steam for converting the unwanted material to gaseous product and to material which is of the class of aluminum oxide and hydroxide and which augments said chemical material in the crushed skim, while maintaining the crushed skim at a temperature, below the melting point of aluminum, insufficient for substantial loss of aluminum metal by reaction in the region, and while withdrawing said gaseous product from the region, to yield a substantially dry, particulate product of the skim, classifiable by particle size into a fine, chemical-containing fraction, which has a substantially higher content of chemical material of the aforesaid class than the skim which was treated, and a coarser fraction, which contains aluminum metal in a substantially higher proportion than in the skim which was treated.

10. A method as defined in claim 9, in which said steam treatment is effected at superatmospheric pressure and at a temperature not higher than about 400° F.

11. A method as defined in claim 10, in which said skim has particle sizes less than about three-fourths inch and said steam treatment is effected for at least several hours.

12. A method as defined in claim 11, in which said steam treatment is effected at pressure of about 15 to 40 psi and for about 4 to 10 hours.

13. A method as defined in claim 9, in which said skim which is treated contains at least about 20 percent aluminum metal, and said steam treatment is effected at superatmospheric pressure and yields said product classifiable into said fractions of which the fine fraction is suitable for employment as chemical addition in the molten bath of a reduction cell and the coarser fraction is suitable for remelting as aluminum metal.

14. A method as defined in claim 13, which includes the step of subjecting said product to classification by particle size to separate said fine and coarser fractions.

15. A method as defined in claim 14, in which said fine fraction consists of and is separated as material having particle size smaller than a predetermined value which is not greater than about one-eighth inch.

16. A method as defined in claim 9, in which said skim which is treated contains at least about 3 percent aluminum metal.

17. In a method of treating segregated material which is separated from a body of molten aluminum after accumulation during standing of said molten aluminum and which contains unwanted material of the class consisting of aluminum carbide and nitride, and chemical material of the class consisting of fluoride, oxide and hydroxide of aluminum and sodium, the step of treating fragments of said segregated material in a confined region with dry steam at a temperature not higher than about 400° F. for a sufficient time to convert the unwanted material to gaseous product and to material which is of the class of aluminum oxide and hydroxide and which augments said chemical material in the segregated material, to yield a product that affords recovery of chemical material of the aforesaid class in substantially dry, particulate form.

18. A method as defined in claim 17, in which said segregated material which is treated contains aluminum metal, and in which said treatment of the segregated material yields a product which is capable of treatment for classification by particle size to separate, from a coarser fraction, a fine, chemical-containing fraction having a substantially lower proportion of aluminum metal and a substantially higher content of said chemical material than said segregated material which is treated.

* * * * *